Patented Dec. 4, 1928.

1,693,715

UNITED STATES PATENT OFFICE.

WILLIAM HOFFMAN KOBBÉ, OF NEW YORK, N. Y., ASSIGNOR TO TEXAS GULF SULPHUR COMPANY, OF BAY CITY, TEXAS, A CORPORATION OF TEXAS.

HARDENED-PLASTER PRODUCT.

No Drawing. Application filed March 14, 1927. Serial No. 175,431.

This invention relates to articles or products made of hardened plaster, and has for its object the provision of certain improvements in the manufacture of such articles or products, as well as the provison of an improved article or product of this character.

Various articles and products of commerce are made up in whole or in part of hardened plaster; plaster board being perhaps the best known example of such products. The ordinary plaster boards of commerce are made up of a body of hardened plaster, usually gypsum plaster, covered in whole or in part with fibrous material. In my co-pending patent application, Serial No. 175,432, filed March 14, 1927, I have disclosed certain improvements in plaster board manufacture involving generally the impregnation with sulfur of the fibrous covering for the hardened plaster body as well as the strengthening of the bond between the fibrous covering and the plaster body by congealed sulfur. These improvements, however, did not contemplate the impregnation with sulfur of the hardened plaster body, other than a slight surface penetration. The present invention is directed towards the impregnation with sulfur of the hardened plaster body itself; and involves a new method of impregnating gypsum plaster and the like with sulfur. While the invention is primarily directed towards plaster board products, such as Rock Lath, Sheet Rock, Gyp Lap, Sackett Board et al., it is applicable to hardened plaster products in general, with or without coverings of fibrous material.

The body or interior of plaster board is ordinarily hardened gypsum plaster. By gypsum I mean calcium sulfate, with or without water of crystallization, plaster of Paris, anhydrite, alabaster and all natural and commercial forms of these substances. Gypsum usually occurs with two molecules of water of crystallization ($CaSO_4.2H_2O$) and is calcined until the water of crystallization is reduced to one-half molecule ($CaSO_4.1/2H_2O$) or until all of the water of crystallization has been driven off. After calcining and grinding the gypsum is mixed with water which causes it to set or harden. Although the exact chemical changes which take place are obscure, it is probable that the gypsum reverts to its native or initial state with two molecules of water of crystallization. However this may be, so far as the present invention is concerned it is applicable to all forms of set or hardened gypsum plaster regardless of the water content.

Ordinary set or hardened gypsum or similar plaster containing materials such as plaster board, cannot be satisfactorily impregnated with molten sulfur by immersion in a bath of this substance probably on account of the combined water in the gypsum. Long periods of immersion, even up to twenty-four hours or more, frequently have no effect excepting to impregnate the immediate surface or for a slight depth of a quarter of an inch or less, and the resulting product is very frangible and invariably cracked. It appears that the sulfur will not enter ordinary gypsum or gypsum containing materials even though the temperature of the molten sulfur bath is such as to partially drive off the combined water. It appears that driving out the combined water in this way has some deleterious effect on the gypsum, probably due to the rapidity of driving off water or calcination which not only retards or entirely prevents the entry of the sulfur, but results in excessive cracking and disintegration.

I have discovered that by slowly preheating the set or hardened gypsum or plaster containing articles, that they may be very successfully and satisfactorily impregnated or treated by immersion in a bath of molten sulfur at 120° to 160° C., or even higher temperatures may be used where paper, fibrous or similar organic products are not involved. It appears essential, not to merely dry the set or hardened gypsum or similar plaster containing materials so as to drive off absorbed water, but to actually heat the articles to a degree to substantially drive off the combined water and I prefer to employ a temperature at least equal to or higher than the temperature of the saturating bath to be subsequently used.

I have further discovered that it is more important to preheat and drive off the combined moisture existing in set or hardened gypsum block and pure set or hardened gypsum products than in the case of set or hardened gypsum combined with fibrous materials or covered with fibreboard or paper such as Sheet Rock, but this may be due to the fact that these coverings partially mitigate or prevent the cracking or disintegration previously described. It is advisable, however, to preheat all of these products that contain set or hardened gypsum although in the case of those containing paper or organic fibrous materials, the heat can not be carried to such a point that it would tend to char the fibres. In the case of Sheet Rock or similar fibrous containing set or hardened gypsum articles, I have found that they may be safely heated to approximately 140° C., while straight set or hardened gypsum block may be heated to practically any reasonable degree of temperature and I have carried it as high as 250° C. at which point the gypsum is completely or substantially calcined.

It is important, however, to preheat the set or hardened gypsum or similar gypsum product at least as high or higher than the temperature of the sulfur bath in which it is to be subsequently treated, either with or without vacuum and pressure. This apparently prevents any moisture or combined water being driven out by the heated sulfur of the sulfur impregnating bath, which I have found is the cause of the disintegration and cracking and also which is responsible for the preventing of the entry of the sulfur.

In the practice of the invention following the preliminary preheating and desiccating operation set or hardened gypsum block or sheets of rock lath or similar set or hardened gypsum containing articles, are immersed in a bath of molten sulfur either in a horizontal or vertical position at a temperature not in excess of the preheating temperature and allowed to remain therein until the desired degree of impregnation has resulted. It is distinctly understood that this method is not limited to complete impregnation because in many cases I prefer to simply treat or impregnate the immediate surface of the set or hardened gypsum or the exposed fibrous materials and the contiguous set or hardened gypsum. The impregnation of the exposed fibrous materials following preheating may be accomplished in thirty minutes to one hour or less, depending upon the thickness of the fibre covering.

Upon removal from the treating bath the molten sulfur is held within the fibre covering and in the set or hardened gypsum immediately adjacent thereto by capillarity and this sulfur, due to its low latent heat very quickly solidifies especially if placed in a current of air or otherwise chilled and the loss from exudation or dripping is negligible.

These sulfur treated fibre-gypsum articles if not perfectly flat may be pressed while still hot or after the first solidification of the sulfur and while it is in its monoclinic stage and more or less plastic, and in this way a perfectly true and flat product assured. As a rule, however, the products mentioned are generally flat and this is unnecessary. On the other hand, they may be deliberately curved or otherwise shaped to a slight degree if this is desirable, but it is important to manipulate them while the sulfur is either molten or in its transition stage as one of the great advantages of the treatment is the fixation which is brought about by stable, rhombic crystals of sulfur.

In my co-pending patent applications Serial No. 61,831, filed October 10, 1925 and Serial No. 124,784, filed July 24, 1926, methods are described for coloring sulfur and for coloring various materials with colored sulfur, and I find that the processes there described are applicable in the practice of the present invention. In accordance with the methods there described I may include in the practice of the present invention, sulfur soluble dyes with the sulfur and thereby impart attractive shades of color to these various gypsum products and I find that the color penetrates as far as the sulfur itself and is of a highly permanent nature.

Products made in accordance with the invention have numerous practical commercial advantages. Set gypsum, in itself, or the various objects composed in part of set gypsum is not proof against weather or moisture and consequently cannot be used out of doors. These products are hydroscopic and rapidly disintegrate when exposed to moisture and are readily acted upon by various acids and chemical fumes. They also lack physical strength for many purposes.

I have discovered that articles composed wholly or in part of set or hardened gypsum when treated in accordance with the method of the invention, are proof against all normal weather conditions and satisfactorily withstand the various acids and chemical fumes. The increase in strength under tension, compression and cross-bending, amounts to three or four fold and sometimes more, depending to some degree upon the extent of the penetration of the sulfur into the gypsum itself.

The new set or hardened gypsum product of the invention may be painted, varnished, lacquered or shellacked and will take practically any finish or it may be colored as hereinbefore described and given a high finish by sanding, buffing or polishing. In many cases in order to reduce inflammability, it is desirable to give the impregnated article a finishing coat of paint or lacquer. These highly finished materials are suited for various purposes, such for instance as radio panels, wall tile and various sanitary products, such as parts for partitions, baseboards, and as a general substitute for slate and other like materials.

While I have mentioned various commercial forms of set gypsum or plaster board, I do not wish to confine myself entirely to these products, since the invention is not limited to the use of these particular products, but is applicable to any form of hardened plaster or set gypsum. The hardened plaster or set gypsum may contain or be associated with some form of fibrous material.

I claim:

1. An article of manufacture comprising dehydrated set gypsum impregnated either wholly or in part with sulfur.

2. An article of manufacture comprising dehydrated set gypsum and a fibrous material impregnated either wholly or in part with sulfur.

3. An article of manufacture comprising dehydrated set gypsum impregnated either wholly or in part with colored sulfur.

4. An article of manufacture comprising dehydrated set gypsum and a fibrous material impregnated either wholly or in part with colored sulfur.

In testimony whereof I affix my signature.

WILLIAM HOFFMAN KOBBÉ.